Dec. 6, 1966 J. ARCHER ETAL 3,289,484
DEVICE FOR THE LEAK-TIGHT TRANSMISSION
OF MOVEMENT THROUGH A WALL
Filed Nov. 12, 1963 3 Sheets-Sheet 1
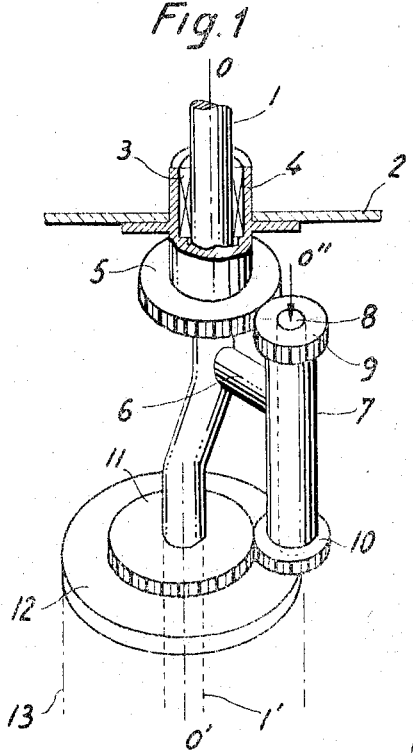
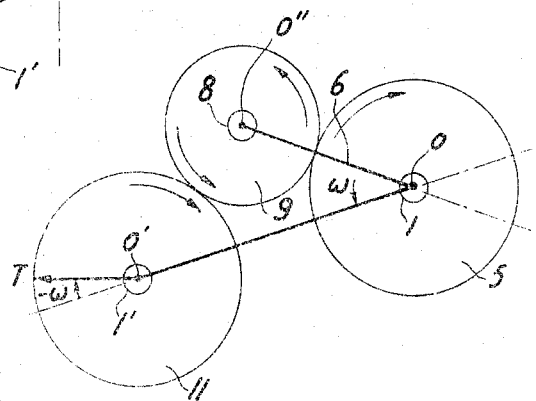
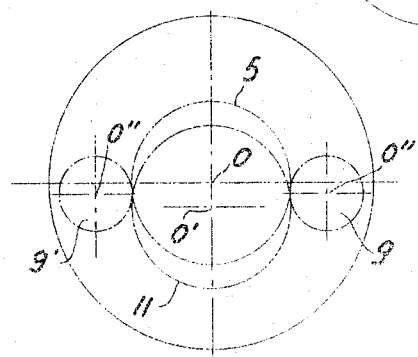
INVENTORS
JACQUES ARCHER
BY PIERRE GEORGES BOIRON
Bacon & Thomas
ATTORNEYS

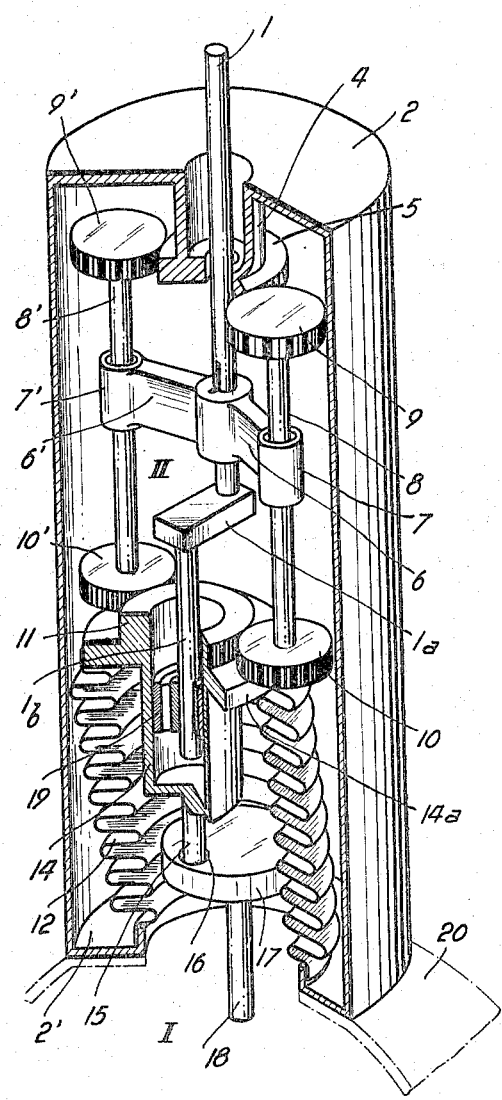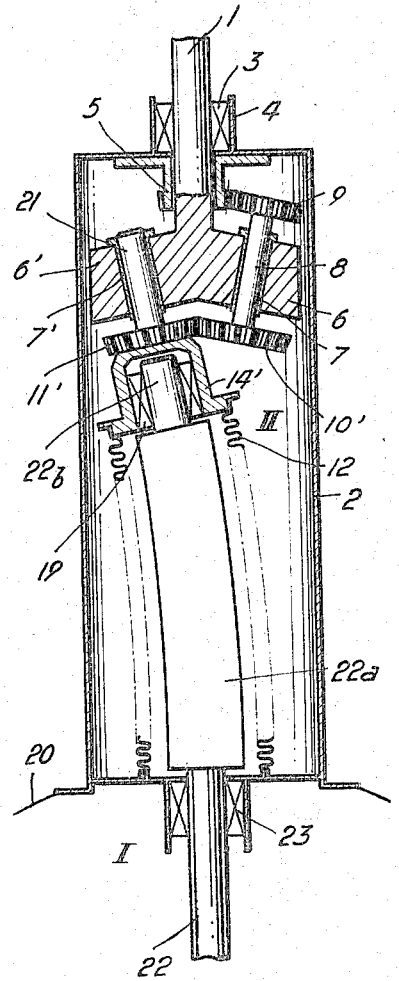

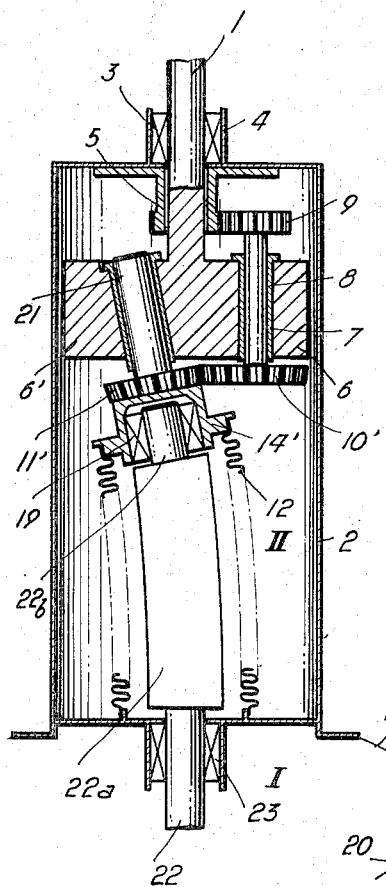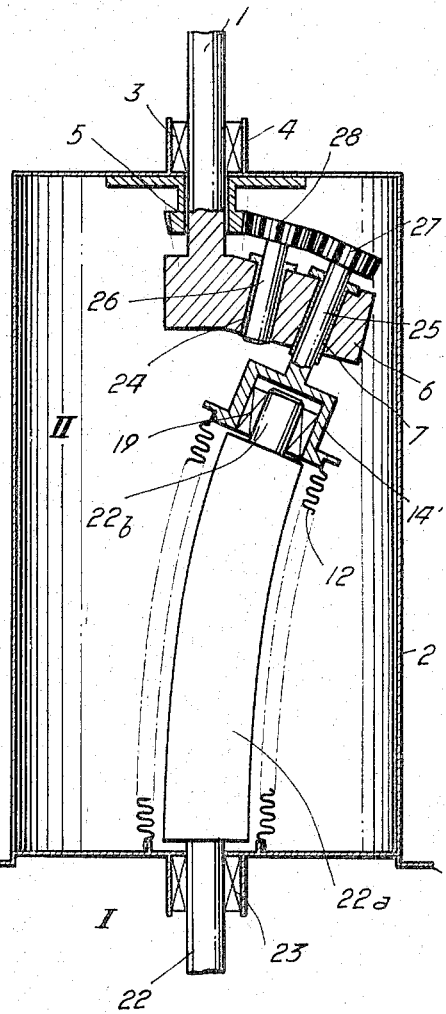

United States Patent Office 3,289,484
Patented Dec. 6, 1966

3,289,484
DEVICE FOR THE LEAK-TIGHT TRANSMISSION OF MOVEMENT THROUGH A WALL
Jacques Archer, L'Hay-les-Roses, and Pierre G. Boiron, Fresnes, France, assignors to Groupement Atomique, Alsacienne Atlantique, Le Plessis-Robinson (Seine), France
Filed Nov. 12, 1963, Ser. No. 322,744
Claims priority, application France, Nov. 13, 1962, 915,284, Patent 1,347,160
7 Claims. (Cl. 74—18.1)

The present invention relates to a device for the leak-tight transmission of movement through a wall.

It is known that it is essential under certain circumstances to provide perfect leak-tightness between adjacent enclosures even when a driving shaft is intended to pass through the wall or walls which form a partition between such enclosures. This is especially the case when radioactive materials are placed within an enclosure and when it is desired to control from the exterior, by a movement of rotation, certain devices which are located within the radioactive enclosure.

The most simple means for providing leak-tightness about a shaft or a control rod consists of a packing gland. However, this solution is unacceptable on account of the fact that leakage produced by wear or by the progressive transformation of sealing materials is inevitable.

Another much more reliable means consists in making use of a membrane which is capable of constituting a flexible wall between the two enclosures. Such a membrane can in fact be constituted by a diaphragm, by a bellows-type seal, by a flexible pipe or by any known means of similar type. The use of a membrane nevertheless imposes certain conditions of practical application in order to ensure durability, that is to say in order to maintain perfect leak-tightness.

It is in fact essential not to subject such a membrane to either rotational or twisting movements about its axis, that is to say to mechanical stresses which are liable to cause very rapid damage. Furthermore, the membrane must not under normal conditions be caused to take part in the transmission of torque from a driving shaft to a driven shaft.

The object of the primary present invention is to produce a device for transmission of movement through a wall wherein the driving shaft and the driven shaft rotate about the same axis and are coupled at a point which is located off-center with respect to said axis in such manner as to transmit a torque from one to the other while at the same time ensuring perfect leak-tightness between said two shafts by means of a deformable membrane.

To this end, the device comprises a membrane having the general shape of a cylinder or like member such as a bellows or flexible pipe, the service life of which is increased by subjecting it only to an alternate bending movement. With this object in view, the membrane is freed from any twisting forces about its axis or about its neutral fiber by virtue of a suitable system which prevents any rotational movement of any one of the transverse sections thereof relative to adjacent sections.

Accordingly, the present invention is directed to a device which is designed for the purpose of maintaining the initial directional orientation of the movable end-section of the deformable cylindrical membrane irrespective of the position of the driven shaft.

The aforesaid device permits the membrane to work under conditions of minimum mechanical bending stress and makes it possible to guide said membrane from the interior, in the case, for example, of high speeds of rotation of the shafts. Moreover, the said device does not take part in the transmission of torque from the driving shaft to the driven shaft (subject to permissible friction in the coupling between the two shafts), thereby permitting the possibility of employing gears having a small module and therefore small size.

The device in accordance with the invention essentially consists of a driving shaft which is adapted to rotate about the same axis as a first stationary pinion and which is provided with at least one crank-arm supporting a shaft on the ends of which are mounted two intermediate pinions, one of said pinions being adapted to mesh with the first stationary pinion while the other intermediate pinion is adapted to mesh with a second fixed-orientation pinion which is secured to the movable extremity of a deformable membrane having the general shape of a cylinder or the like, the other extremity of said deformable membrane being secured to the wall with respect to which leak-tightness is ensured, said wall being pierced with a hole having its opening in said membrane and providing a passageway for the driven shaft, that end of said shaft which is displaced relative to the axis of the driving shaft being adapted to rotate within the second fixed-orientation pinion while following the eccentric movements which are imparted thereto by the crank-arm, the intermediate pinions having the effect of constantly maintaining the initial orientation of the movable extremity of said membrane.

Each shaft on which the intermediate pinions are mounted can be parallel to the axis of the driving shaft or inclined to said axis. Moreover, the driven shaft can form an extension of the driving shaft which is suitably elbowed so as to displace the axis of the driven shaft off-center with respect to its own axis, said extension being adapted to rotate within the second fixed-orientation pinion.

Rotational motion can be imparted to the driven shaft through the intermediary of a plate to which said shaft is rigidly secured, rotational motion being in turn imparted to said plate by a hollow member which is displaced off-center relative to the axis of the driven shaft and in the interior of which the suitably elbowed extremity of the driving shaft is adapted to rotate, said hollow member being secured to the movable extremity of the deformable membrane.

The driven shaft can have a curvature which corresponds to the constant curvature of the membrane and the top extremity of said driven shaft is capable of rotating within a member which is secured to the movable extremity of said membrane and integral with the second fixed-orientation pinion, this latter having a shaft which is journalled in an inclined bearing fitted in the crank-arm of the driving shaft.

The coupling between the first stationary pinion and the second fixed-orientation pinion can be carried into effect by means of an intermediate pinion carried by a shaft which is rotatably mounted in the crank-arm of the driving shaft, there being also fitted in said crank-arm the second fixed-orientation pinion mounted on the end of a shaft which passes through said crank-arm and which forms one piece with a hollow member to which is attached the movable extremity of the membrane.

The device in accordance with the invention is described in detail hereinafter by means of a number of examples of embodiment which are given solely by way of indication, reference being made to the accompanying drawings, wherein:

FIG. 1 shows diagrammatically one portion of a first form of construction of the device;

FIG. 2 is an explanatory diagram of the kinematics of operation of said device;

FIG. 3 is a sectional view of a second form of construction of the device;

FIG. 4 is a diagram showing the operation of an alternative form of FIG. 3;

FIG. 5 represents a third form of construction of the device;

FIG. 6 shows an alternative form of construction of FIG. 5;

FIG. 7 shows a fourth form of construction of the device.

The same reference numerals have been employed in the different figures in order to designate similar components.

In the simplest form of embodiment which is illustrated in FIG. 1, the device in accordance with the invention comprises a driving shaft 1 which passes through a wall or casing 2 and which is rotatably mounted in a ball-bearing 3 fitted in a plummer-block 4 which is secured to said wall. A stationary pinion 5 is integral with said plummer-block and is also carried by the shaft 1.

There is mounted on the shaft 1 a crank-arm 6 carrying a sleeve 7 which serves as a bearing for a shaft 8 on the ends of which are keyed two pinions 9 and 10.

Below the crank-arm 6, the shaft 1 is elbowed so as to displace the axis O' of its line of extension relatively to its rectilineal axis O, the extension of said shaft being intended to constitute means 1' for driving the driven shaft after having passed through a second pinion of fixed directional orientation 11 which is secured to the movable extremity of a deformable membrane 12 such as a bellows, a flexible pipe or the like, while the other extremity of said deformable membrane is attached to the wall of an enclosure (which has not been shown in FIG. 1 but may be of the same type disclosed with reference to the construction of FIG. 3, for example) for the purpose of providing leak-tightness with respect to said wall.

The kinematic description of the device is as follows (see FIG. 2):

The distance between the axis O of the driving shaft 1 and the axis O' of the means 1' for driving the driven shaft represents the displacement off-center of the axis of the crank-arm which transmits the torque between the two shafts. Given that the axes O' and O'' (the position of the axes, O, O' and O'' being invariable fixed) rotate about the axis O at the angular velocity of motion ω, and that the pinion 11 is driven at the speed —ω about O', any vector such as O'T will accordingly be displaced parallel to itself and the pinion 11 will be endowed with a circular movement of translation; in other words, the pinion 11 will always retain a "fixed directional orientation." It is thus merely necessary to couple the movable extremity of the deformable membrane 13 to said pinion in order to ensure that said membrane is thus freed from the twisting efforts which can be produced by friction in the crank-arm which transmits the torque.

The easiest way of obtaining this continuous "re-setting," that is to say this constancy of directional orientation of the extremity of the membrane, is to interpose the intermediate pinion 9 between the pinions 5 and 11 if these latter are identical. For reasons of assembly and operation, either cylindrical spur gears or bevel gears can be employed for said pinions and can be either of the internal contact or external contact type with different numbers of teeth. It is then necessary to make provision for one or a number of pairs of intermediate pinions so as to produce the ratio:

$$\frac{\text{Speed of rotation of the crank-arm which carries the pinion 11 relative to the casing of the enclosure}}{\text{Speed of rotation of pinion 11 relative to the crank-arm}} = -1$$

It will be apparent that the device can be constructed in a number of alternative forms.

In a second form of construction which is shown in FIG. 3, the driving shaft 1 carries two crank-arms 6 and 6' which terminate in bearings 7 and 7' in which are rotatably mounted two shafts 8 and 8'. Pinions 9 and 9' are mounted on the ends of the shafts 8 and 8' and are adapted to mesh with a pinion 5 which is integral with the plummer-block 4.

The shaft 1 is provided after the crank-arms 6 and with a crank-arm 1a on which is fixed an extension $1_b$ placed in the interior of a tubular member 14 forming one piece with the pinion 11. The member 14 is provided with a tail-portion 15 which is fitted inside a hole 16 formed in a plate 17 fixed on the end of the driven shaft 18.

The tubular member 14 comprises an annular flange 14a to which is attached the movable extremity of a deformable cylindrical membrane 12, the other extremity of said membrane being secured to the base 2' of the casing 2. There is mounted inside the tubular member 14 a needle-bearing 19 in which is fitted the extension $1_b$ of the driving shaft 1.

The casing 2 is secured to the enclosure 20 so as to complete the leak-tightness of the assembly relative to said casing.

The operation of said device as represented diagrammatically in FIG. 4 is identical to that described in reference to FIG. 2.

In a third form of construction which is shown in FIG. 5, the driving shaft 1 is provided with two crank-arms 6 and 6'. The crank-arm 6 is fitted with a bearing 7 traversed by a shaft 8 on the ends of which are keyed two pinions 9 and 10'. The pinion 9 meshes with the stationary pinion 5 and the pinion 10' meshes with the pinion 11' which is integral with the member 14', the movable extremity of the membrane 12 being attached to said member 14'.

The pinion 11' is integral with a journal 21 which is rotatably mounted in a bearing 7' fitted in the crank-arm 6'. The crank-arms 6 and 6' are inclined at an angle and all the pinions are therefore bevel-pinions.

The drive shaft 22 has a curved portion 22a, the end of which has a journal $22_b$ which is rotatably mounted in a needle-bearing 19' housed in the tubular member 14'. The driven shaft 22 passes through a roller-bearing 23 which is supported on the bottom of the casing 2.

As a variant of the third form of construction, which is shown in FIG. 6, the crank-arms 6 and 6' are at right angles with respect to the driving shaft 1 and the shaft 8 is journaled in a bearing 7 disposed parallel to the driving shaft.

The bearing 7' is inclined with respect to the shaft 1 and the journal 21 has an angle of inclination which is similar to that of the journal of FIG. 5.

In this alternative form, the pinions 5 and 9 have straight teeth and the pinions 11' and 10' have bevel teeth.

The device can also be designed so that the top end of the driven shaft has an orientation which corresponds to that of an inclined bearing carried by the crank-arm of the driving shaft and rotates in a member which is secured to the movable extremity of the membrane (the length of which has in this case been reduced) and which is also integral with the second fixed-orientation pinion, this latter having a shaft which is rotatably mounted in an inclined bearing fitted in the crank-arm of the driving shaft.

For constructional as well as operational reasons, the inclined bearing which is fitted in the crank-arm of the driving shaft is capable of carrying a translational movement as well as a rotational movement relative to said crank-arm.

In a fourth form of construction which is shown in FIG. 7, the driving shaft 1 is provided with only one crank-arm 6 which can be inclined or not relative to the axis of said shaft. In said crank-arm are fitted two bearings 7 and 24 in which are rotatably mounted shafts 25 and 26 respectively. The end of the shaft 25 is provided with a pinion 27 (which corresponds to the pinion 11 of FIG. 1) and the end of the shaft 26 is provided with a pinion 28. The pinion 27 meshes with the pinion 28 which corresponds to the pinions 9, 10 of FIG. 1 and said pinion 28 meshes with the pinion 5.

The axes of the shafts 25 and 26 have different angles of inclination and the pinions 5, 28 and 27 have corresponding conicities.

The shaft 25 forms one piece at the bottom end thereof with a tubular member 14' to which is attached the movable extremity of the membrane 12, the other elements of the device being similar to those shown in FIGS. 5 and 6. In this form of construction, the pinion 27 performs the function of a pinion of fixed directional orientation and the pinion 28 performs the function of intermediate pinion. In FIGS. 3, 5, 6 and 7, perfect leak-tightness is ensured between the enclosures I and II by the member 14 (as shown in FIG. 3) or 14' (as shown in FIGS. 5, 6, 7) and by the deformable membrane 12.

It should be noted that it is in the forms of construction shown in FIGS. 5 to 7 that the stresses to which the membrane is subjected are lowest. The bending moment or the curvature, which amounts to the same thing, is of minimum value and the shear stress is zero. Furthermore, inasmuch as the radius of curvature of the membrane is constant, it is possible to endow the end of the driven shaft with the shape of a sector of a torus of revolution as shown in these figures, thereby permitting the possibility, in the case of high speeds of rotation, of guiding the membrane from the interior.

What we claim is:

1. A device for the leak-tight transmission of movement through a wall, said device comprising a driving shaft, a stationary pinion, said driving shaft rotating about the same axis as said stationary pinion, at least one crank arm attached to said driving shaft for rotation therewith, an intermediate shaft supported by said crank arm, at least one intermediate pinion carried by the intermediate shaft and operably geared to said stationary pinion, a pinion of fixed directional orientation having its axis off-set with respect to the axis of said driving shaft, said last-mentioned pinion meshing with at least another intermediate pinion carried by said intermediate shaft, whereby the rotation of the driving shaft is transmitted as a circular translational movement of the pinion of fixed directional orientation, a deformable membrane having one end thereof fixedly secured to said pinion of fixed directional orientation and the other end secured to said wall, a hole in said wall opening into a space within said membrane, and a driven shaft passing through said hole into said space, said driven shaft being operably connected at its inner end with said pinion of fixed directional orientation, whereby the circular translational movement of said pinion of fixed directional orientation produces a rotational movement of the driven shaft corresponding to that of said driving shaft.

2. A device as claimed in claim 1, wherein said intermediate shaft is parallel to the axis of said driving shaft.

3. A device as claimed in claim 1, wherein said intermediate shaft is inclined to the axis of the driving shaft.

4. A device as claimed in claim 1, wherein said driven shaft is driven by means comprising an extension of the driving shaft, said driving shaft being suitably elbowed so as to displace the axis of said extension off-center with respect to its own axis, said means rotating with a mechanical coupling attached to said pinion of fixed directional orientation.

5. A device as claimed in claim 1 wherein a plate is rigidly secured to said driven shaft for imparting rotational movement thereto and wherein a hollow member is secured to the movable extremity of said deformable membrane and displaced off-center with respect to the axis of said driven shaft and connected thereto, an off-set extremity of said driving shaft being engaged with the interior of said hollow member for imparting rotary motion thereto.

6. A device as claimed in claim 1, wherein said driven shaft has a curvature which corresponds to the constant curvature of the membrane in such manner that the upper extremity of said driven shaft is capable of rotating within a member which is secured to the movable extremity of said membrane and which is integral with the fixed-orientation pinion, said pinion of fixed directional orientation having a shaft which is journaled in an inclined bearing fitted in the crank-arm of the driving shaft.

7. A device as claimed in claim 1, wherein a coupling is provided between said stationary pinion and said pinion of fixed orientation by means of a single intermediate pinion carried by a shaft rotatably mounted in the crank-arm of said driving shaft, said crank-arm also being provided with said pinion of fixed directional orientation mounted on the end of a shaft which passes through said crank-arm and is integral with a hollow member to which is attached the movable extremity of the membrane.

References Cited by the Examiner
UNITED STATES PATENTS

| | | | |
|---|---|---|---|
| 2,305,505 | 12/1942 | Wagner | 74—18.1 |
| 2,551,847 | 5/1951 | Nelson | 74—17.8 |
| 2,837,926 | 6/1958 | Korsgren et al. | 74—17.8 |
| 3,082,632 | 3/1963 | Vulliez | 74—18.1 |

MILTON KAUFMAN, *Primary Examiner.*